US008600644B2

(12) United States Patent
Verner et al.

(10) Patent No.: US 8,600,644 B2
(45) Date of Patent: Dec. 3, 2013

(54) CYLINDER PRESSURE SENSOR COMPENSATION SYSTEMS AND METHODS

(75) Inventors: Douglas R. Verner, Sterling Heights, MI (US); Kenneth J. Buslepp, Brighton, MI (US)

(73) Assignee: GM Global Technology Operations LLC

(*) Notice: Subject to any disclaimer, the term of this patent is extended or adjusted under 35 U.S.C. 154(b) by 358 days.

(21) Appl. No.: 13/113,496

(22) Filed: May 23, 2011

(65) Prior Publication Data

US 2012/0303238 A1 Nov. 29, 2012

(51) Int. Cl.
*G06F 19/00* (2011.01)
*G01M 15/08* (2006.01)

(52) U.S. Cl.
USPC .......................... 701/102; 123/435; 73/114.16

(58) Field of Classification Search
USPC .......... 701/102, 107, 111, 114, 115; 123/435; 73/35.03, 35.12, 114.16, 114.18, 73/114.58, 114.77
See application file for complete search history.

(56) References Cited

U.S. PATENT DOCUMENTS

| | | | | |
|---|---|---|---|---|
| 4,466,405 | A * | 8/1984 | Hattori et al. | 123/406.42 |
| 6,684,151 | B1 * | 1/2004 | Ring | 701/110 |
| 7,124,020 | B2 * | 10/2006 | Vermonet et al. | 701/114 |
| 7,761,223 | B2 * | 7/2010 | Wang et al. | 701/114 |
| 8,033,267 | B2 * | 10/2011 | Nakagawa et al. | 123/406.22 |
| 2011/0303190 | A1 * | 12/2011 | Yasuda | 123/435 |

* cited by examiner

*Primary Examiner* — John Kwon
*Assistant Examiner* — Johnny Hoang

(57) ABSTRACT

A sensor reset system includes an engine control module and a sensor reset circuit. The engine control module is configured to receive a sensor pressure signal from a cylinder pressure sensor. The sensor pressure signal indicates a pressure within a cylinder of an engine. The engine control module is further configured to: control operation of the engine based on the sensor pressure signal; determine whether to reset the cylinder pressure sensor and generate a reset signal; and encode the reset signal to generate an encoded reset signal. The sensor reset circuit is configured to adjust an output of the cylinder pressure sensor based on the encoded reset signal to reset the cylinder pressure sensor.

20 Claims, 4 Drawing Sheets

CYLINDER PRESSURE SENSOR COMPENSATION SYSTEMS AND METHODS

FIELD

The present disclosure relates to engine control systems, and more particularly to systems that compensate for cylinder pressure sensor drift compensation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (NF) mixture within cylinders to drive pistons that rotatably turn a crankshaft and generate drive torque. Operation of the engine (e.g., air/fuel ratios, fuel and spark timing, intake and exhaust valve timing, etc.) may be controlled based on various parameters. The parameters may be determined based on pressures within the cylinders. For example, an engine control module (ECM) may determine an indicated mean effective pressure (IMEP), a location to peak pressure (LPP), and percentages of air/fuel mixtures burnt in the cylinders (or burnt mass within the cylinders) at various crank angles (e.g., crank angle (CA) 10, CA50, and CA90). The IMEP, the LPP and the percentages of burnt mass may be determined based on detected pressures within the cylinders.

Cylinder pressure sensors may be used to directly detect pressures within the cylinders of an engine. During operation, signal outputs of the cylinder pressure sensors can drift over time. As a result, the output signals can become saturated during LOW or HIGH pressure conditions. For example, a cylinder pressure sensor may have an operating output voltage range of 0.5V-4.5V. The cylinder pressure sensor may be initially setup such that 0.5V corresponds to a lowest pressure to be measured by the sensor (e.g., during an intake or exhaust stroke) and 4.5V corresponds to a highest pressure to be measured by the sensor (e.g., at the end of a compression stroke). Due to drifting, the output of the sensor may be saturated LOW such that pressures greater than the lowest pressure provide a voltage output of 0.5V. As another example, the output of the sensor may be saturated HIGH such that pressures less than the greatest pressure provide a voltage output of 4.5V. As a result, the output signal generated by the cylinder pressure sensor can become inaccurate over time. This can negatively affect engine parameter determination and control of engine operation.

SUMMARY

A sensor reset system is provided and includes an engine control module and a sensor reset circuit. The engine control module is configured to receive a sensor pressure signal from a cylinder pressure sensor. The sensor pressure signal indicates a pressure within a cylinder of an engine. The engine control module is further configured to: control operation of the engine based on the sensor pressure signal; determine whether to reset the cylinder pressure sensor and generate a reset signal; and encode the reset signal to generate an encoded reset signal. The sensor reset circuit is configured to adjust an output of the cylinder pressure sensor based on the encoded reset signal to reset the cylinder pressure sensor.

In other features, a method of resetting a cylinder pressure sensor is provided. The method includes receiving a sensor pressure signal from the cylinder pressure sensor. A parameter is calculated to correct a measured pressure to an absolute pressure. The method determines whether the parameter has exceeded predetermined thresholds, at which point a reset signal is generated via an engine control module. The reset signal is encoded and interpreted by the pressure sensor to correct the sensor output by adjusting an offset of the sensor pressure signal.

In other features, a method of resetting a cylinder pressure sensor is provided. The method includes receiving a sensor pressure signal from the cylinder pressure sensor. A parameter of at least one of the cylinder pressure sensor and a cylinder of an engine is determined based on the sensor pressure signal. The method further includes determining whether the parameter has exceeded a predetermined threshold. A reset signal is generated via an engine control module when the parameter has exceeded the threshold. The reset signal is encoded to generate an encoded reset signal. An output of the cylinder pressure sensor is adjusted based on the encoded reset signal to reset the cylinder pressure sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
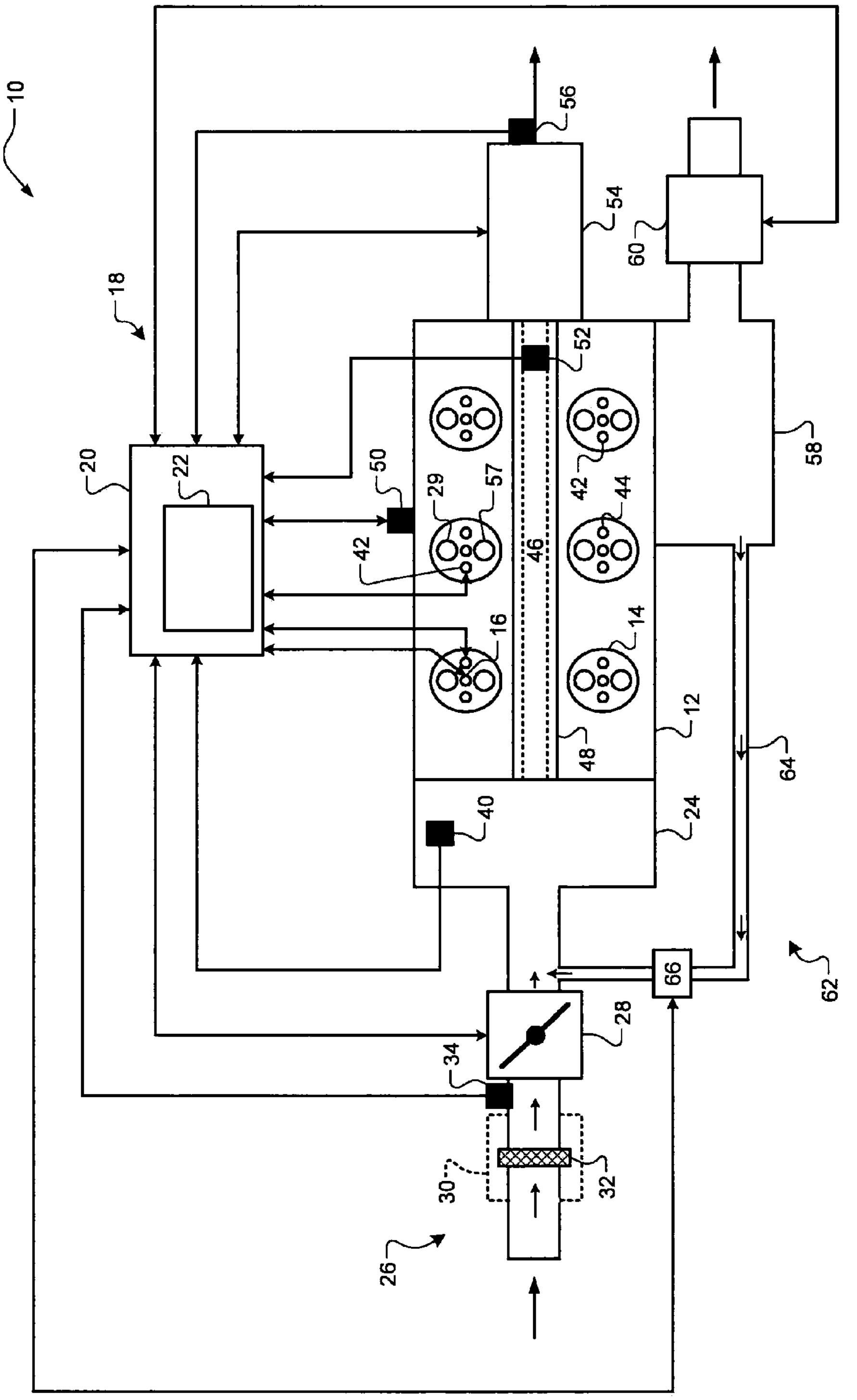
FIG. 1 is a functional block diagram of an engine system a cylinder pressure sensor reset system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A cylinder pressure sensor may have an output voltage swing of, for example 0.5V-4.5V corresponding relative to pressures within a pressure range (e.g., 0-140 bar). The output signal of a cylinder pressure sensor can drift over time due to thermal effects and electrical circuit operation variability. To compensate for the drifting, the cylinder pressure sensor may be reset. Resetting the cylinder pressure sensor may include shifting the output voltage range of the sensor relative to detected pressures up or down depending on a drifting direction of the output signal.

The sensor may include logic to internally detect output drifting of the sensor and perform a reset. A control module in the sensor may detect when the output has drifted outside a predetermined range and perform a step change to compensate for the drifting. This type of resetting can negatively affect combustion calculation accuracy and performance of an engine control system.

As an alternative, the sensor may be reset based on a reset signal generated by an engine control module. This may include pulling the output of the cylinder pressure sensor down to a ground or reference potential for a predetermined period of time. A current pressure detected by the cylinder pressure sensor may be used as a calibration point to reset the cylinder pressure sensor. A control module within the cylinder pressure sensor may detect this drop in voltage and reset a calibration value in the sensor, such that the current pressure detected by the sensor is updated to correspond to the lowest voltage. Although this technique may reset the cylinder pressure sensor, this technique has associated disadvantages.

If the cylinder pressure sensor is reset during, for example, high pressure periods (e.g., at the end of a compression stroke or during the expansion stroke), the sensor may be improperly reset. This can cause the sensor to operate in saturation and/or cause pressures calculated based on a signal from the sensor to be inaccurate.

In addition, a cylinder pressure sensor that is reset using the above described technique may be affected by electromagnetic interference (EMI) and/or other noise signals. The EMI and/or noise signals may inadvertently cause the cylinder pressure sensors to reset sporadically. For example, EMI generated due to the activation and deactivation of an engine, a motor, a solenoid, etc. can be detected by the sensor and if large enough can cause the sensor to reset.

Accordingly, the implementations disclosed below include resetting (or calibrating) cylinder pressure sensors and overcome the above-described disadvantages.

Homogeneous charge compression ignition (HCCI) engines may operate in different modes. In a first mode, also known as "mixed combustion mode," HCCI engines may compress the A/F mixture within the cylinders and ignite the compressed A/F mixture using spark from spark plugs. In a second mode, also known as "HCCI combustion mode," HCCI engines may compress the A/F mixture until the A/F mixture automatically combusts. For example, the A/F mixture may automatically combust after exceeding a critical pressure or temperature threshold.

Although the following description is primarily described with respect to a HCCI engine, the implementations disclosed herein may be applied to cylinder pressure sensors of other engines.

Referring now to FIG. 1, an engine system 10 includes an HCCI engine 12 (hereinafter referred to as "engine 12"). The engine system 10 may be a hybrid vehicle system and include additional components such as an electric motor and a battery system (not shown). The engine 12 includes cylinders 14 with respective cylinder pressure sensors 16. The engine system 10 further includes a sensor reset system 18, which includes an engine control module (ECM) 20 and the cylinder pressure sensors 16. The ECM 20 has a cylinder pressure module 22 that controls resetting the cylinder pressure sensors 16. The cylinder pressure module 22 generates reset signals that are used to reset the cylinder pressure sensors 16, as described further below.

In operation, the engine 12 draws air into an intake manifold 24 through an induction system 26 that may be regulated by a throttle 28 and into the cylinders 14 through intake valve opening 29. For example, the throttle 28 may be electrically controlled using electronic throttle control (ETC). The induction system 26 may include an air filter housing 30 and an air filter 32. The air filter 32 may filter air drawn into the intake manifold 24 to remove particulates. A mass air flow (MAF) sensor 34 measures a rate of airflow through the throttle 28 into the intake manifold 24. For example, the measured MAF rate may indicate a load on the engine 12. An oxygen sensor 40 measures an oxygen concentration of air inside the intake manifold 24. The oxygen sensor 40, however, may also be located in another suitable location within the induction system 26.

Fuel injectors 42 inject fuel into intake ports of the cylinders 14 (port fuel injection) or directly into the cylinders 14 (direct fuel injection). In the mixed combustion mode, spark plugs 44 may assist in igniting the A/F mixture within the cylinders 14 to drive pistons which rotatably turn a crankshaft 46 and generate drive torque. In the HCCI combustion mode, however, the A/F mixture may be compressed until auto-ignition due to a critical pressure and/or temperature being exceeded. The crankshaft 46 may be connected to pistons (not shown) of the cylinders 14, respectively, and housed within a crankcase 48 that includes oil for lubrication of moving parts.

An engine temperature sensor 50 measures a temperature of the engine 12. For example, the engine temperature sensor 50 may measure intake air temperature (IAT), engine coolant temperature (ECT), or engine oil temperature (EOT). The engine temperature sensor 50, therefore, may be located at another suitable location and may measure another suitable temperature. Any number of engine temperature sensors may be incorporated in the engine system 10.

An engine speed sensor 52 measures a rotational speed of the crankshaft 46 (i.e., engine speed). For example, the engine speed sensor 52 may measure the engine speed in revolutions per minute (RPM). A transmission 54 transfers the drive torque from the crankshaft 46 to a driveline (e.g., wheels) of a vehicle. In some implementations, the transmission 54 may be coupled to the crankshaft 46 via a fluid coupling such as a torque converter (not shown). A transmission output shaft speed (TOSS) sensor 56 measures a rotational speed of an output shaft of the transmission 54. For example, the TOSS sensor 56 may measure the TOSS in RPM. Measurements from the TOSS sensor 56 may be used to determine vehicle speed.

Exhaust gas resulting from combustion may be expelled from the cylinders 14 and out exhaust valve openings 57 into an exhaust manifold 58. An exhaust treatment system (ETS) 60 may treat the exhaust gas in the exhaust manifold 58 to remove particulates and/or decrease emissions before releasing the exhaust gas into the atmosphere. For example, the ETS 60 may include at least one of oxidation catalysts, nitrogen oxide absorbers/adsorbers, selective catalytic reduction systems, particulate matter filters, and three-way catalytic converters. An EGR system 62 circulates exhaust gas from the exhaust manifold 58 back into the intake manifold 24. The EGR system 62 includes an EGR line 64 that connects the exhaust manifold 58 and the intake manifold 24. The EGR system 62 further includes an EGR valve 66 that regulates the flow of exhaust gas into the intake manifold 24.

The ECM 20 controls operation of the engine system 10. The ECM 20 may control operation of the engine 12 based on various parameters. The parameters may be determined and/or estimated by the ECM 20 and/or the cylinder pressure module 22. The parameters may include, for example, an indicated mean effective pressure (IMEP), a location to peak pressure (LTP), and percentages of air/fuel mixtures in the cylinders 14 (or mass within the cylinders 14) burnt at various crank angles (e.g., crank angle (CA)10, CA50, and CA90). The ECM 20 and/or the cylinder pressure module 22 may determine and/or estimate the parameters based on pressures within the cylinders 14, which may be determined based on signals from the cylinder pressure sensors 16.

The ECM 20 may also control operation of the engine 12 based on signals from the throttle 28, the MAF sensor 34, the oxygen sensor 40, the fuel injectors 42, the spark plugs 44, the engine temperature sensor 50, the engine speed sensor 52, the transmission 54, the TOSS sensor 56, the ETS 60, and/or the EGR valve 66. The ECM 20 may control operation, position, pressures, timing, etc. of the throttle 28, the fuel injectors 42, the spark plugs 44, the transmission 54, the ETS 60 and/or the EGR valve 66.

In the following FIGS. 2 and 3 sensor reset systems 100, 102 are shown. The sensor reset systems 100, 102 may be used in the engine system 10 of FIG. 1 to replace the sensor reset system 18. The sensor reset system 100 provides pull down reset control. The sensor reset system 102 provides pull up reset control.

The sensor reset systems 100, 102 include respective ECMs 104, 106, reset circuits 108, 110 and cylinder pressure sensors 112, 114. The reset circuits 108 and 110 may be partially or fully located within the ECMs 104, 106, the cylinder pressure sensors 112, 114, or may be separate from the ECMs 104, 106 and the cylinder pressure sensors 112, 114, as shown. The ECMs 104, 106 signal the cylinder pressure sensors 112, 114 by generating reset signals RESET1 and RESET2 to reset the cylinder pressure sensors 112, 114. The cylinder pressure sensors 112, 114 detect pressures in cylinders of an engine (e.g., a cylinder of the engine 12 of FIG. 1) and generate cylinder pressure signals PRES1, PRES2.

The cylinder pressure sensors 112, 114 include respective sensor elements 116, 118, a sensor control modules 120, 122 and a sensor memories 124, 126. The sensor elements 116, 118 may include, for example, piezoelectric and/or piezoresistive elements. The sensor control modules 120, 122 may be, for example, ASICs and control resetting of the cylinder pressure sensors 112, 114. The cylinder pressure sensors 112, 114 may not be absolute sensors, but rather relative pressure sensors.

The reset circuit 108 pulls down output 130 of the cylinder pressure sensor 112 to a voltage reference or ground reference 132 one or more times during a reset of the cylinder pressure sensor 112. The reset circuit 110 pulls up output 133 of the cylinder pressure sensor 114 to a voltage reference 134 (e.g., voltage supply Vdd) one or more times during a reset of the cylinder pressure sensor 114. The pull down and/or up of the outputs 130, 133 of the cylinder pressure sensors 112, 114 are detected as signals from the ECMs 104, 106 by the cylinder pressure sensors 112, 114. The cylinder pressure sensors 112, 114 reset based on the detected signals from the ECMs 104, 106. The detected signals may be referred to as pull down, pull up, and/or reset signals.

The ECMs 104, 106 include processors 140, 142, ECM memory 144, analog-to-digital (A/D) channels (or A/D channel modules 146, 148), and control channel (or control channel modules 149, 151). The processors 140, 142 include respective timer control modules 150, 152 with cylinder pressure modules 154, 156 and a timer 158. The processors 140, 142, the timer control modules 150, 152 and/or the cylinder pressure modules 154, 156 receive the cylinder pressure signals PRES1, PERS2 and monitor pressures detected by the cylinder pressure sensors 112, 114. The cylinder pressure modules 154, 156 control resetting of the cylinder pressure sensors 112, 114.

The cylinder pressure modules 154, 156 may reset the cylinder pressure sensors 112, 114 periodically, at certain time intervals, under certain conditions, and/or based on the cylinder pressure signals PRES1, PRES2. The cylinder pressure modules 154, 156 may reset the cylinder pressure sensors 112, 114, for example, when voltages of the cylinder pressure signals PERS1, PRES2 exceed a predetermined threshold and/or are outside a predetermined range. As another example, cylinder pressure modules 154, 156 may reset the cylinder pressure sensors 112, 114, for example, when pressures determined based on the cylinder pressures signals PRES1, PRES2 exceed a threshold and/or are outside a predetermined range.

The cylinder pressure modules 154, 156 may calculate cylinder pressures based on the cylinder pressure signals PRES1, PRES2. The cylinder pressures may be pressures indicated by the cylinder pressure sensors 112, 114 (measured pressures), actual (or absolute) pressures, and/or offset pressures (differences between measured and actual pressures). The pressures may be determined during low pressure conditions, such as when an intake valve and/or an exhaust value are open. The intake and/or exhaust valve may be open, for example, during intake and exhaust stroke of the engine.

The actual (or absolute) pressures in a cylinder may be tied to atmosphere (have a unit of measure) and determined, for example, when an intake valve of the cylinder is open. The measured pressure may be pegged to a manifold absolute pressure (MAP) from a MAP sensor. The actual pressures may also or alternatively be determined based on properties of a pressure signal during a compression cycle.

The sensor control modules 120, 122 may reset the cylinder pressure sensors 112, 114 based on the detected reset signals. The sensor control modules 120, 122 may compare the voltages and/or durations of voltage drops in the cylinder pressure signals PRES1, PRES2 and/or at the outputs 130, 133 to predetermined values stored in the sensor memories 124, 126.

The reset circuit 108 includes a transistor 150 and a resistance 152. The transistor 150 includes a first terminal 154, a second terminal 156 and a control terminal 158. The resistance 152 is connected between the A/D channel module 146 and the first terminal 154 and between the A/D channel module 146 and the cylinder pressure sensor 112. The first terminal 154 receives the cylinder pressure signal PRES1. The second terminal 156 is connected to a voltage or ground reference 132.

The control terminal 158 is connected to the control channel module 149 and receives the reset signal RESET1. In operation, the transistor 150 is switched from a first or (OFF) state to a second (or ON) state based on the reset signal RESET1. The cylinder pressure signal PRES1 is provided from the cylinder pressure sensor 112 to the A/D channel module 146 when the transistor 150 is in the first state. The transistor 150 pulls the voltage at the output 130 to the voltage or ground reference 132 when in the second state. This drop in voltage is detected by the sensor control module 120, which determines whether to reset the cylinder pressure sensor 112 based on the change in output voltage.

The reset circuit 110 includes a transistor 160 and a first resistance 162. The transistor 160 includes a first terminal 164, a second terminal 166 and a control terminal 168. The first resistance 162 is connected between the A/D channel module 148 and the second terminal 166 and between the A/D channel module 148 and the cylinder pressure sensor 114. The second terminal 166 is connected to the output 133 and to a voltage reference or ground reference 167. The first terminal 164 is connected to the voltage reference 134. The control terminal 168 is connected to the control channel module 151 and receives the reset signal RESET2. A second resistance 169 may be connected between the voltage reference 134 and the first terminal 164.

As another example, the transistor 160 although shown as a NPN transistor, may be replaced with a PNP transistor. The emitter of the PNP transistor may be connected to a voltage supply reference, such as $V_{dd}$ (e.g., +5V).

In operation, the transistor 160 is switched from a first or (OFF) state to a second (or ON) state based on the reset signal RESET2. The cylinder pressure signal PRES2 is provided from the cylinder pressure sensor 114 to the A/D channel module 148 when the transistor 160 is in the first state. The transistor 160 pulls the voltage at the output 133 of the cylinder pressure sensor 114 to the voltage of the voltage reference 134 when in the second state. This increase in voltage is detected by the sensor control module 122, which determines whether to reset the cylinder pressure sensor 114 based on the change in output voltage.

Figure 2:
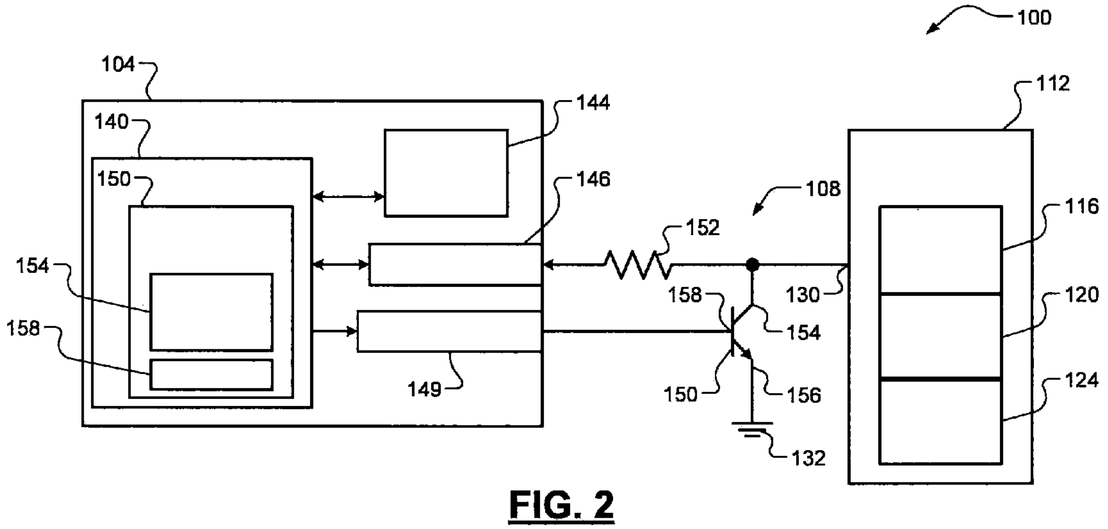
FIG. 2 is functional block diagram of a sensor reset system with pull down reset control in accordance with the present disclosure.
Figure 3:
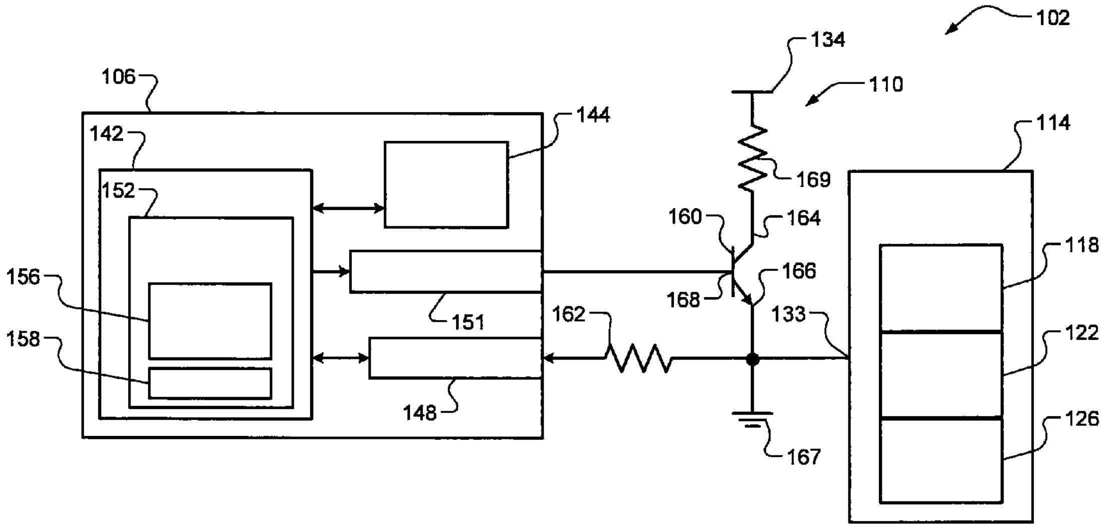
FIG. 3 is functional block diagram of a sensor reset system with pull up reset control in accordance with the present disclosure.

Although in FIGS. 2 and 3 reset signals are provided on output signal lines of the cylinder pressure sensors 112, 114, the reset signals may be provided on a power input or power supply line of the cylinder pressure sensors 112, 114.

Figure 4:
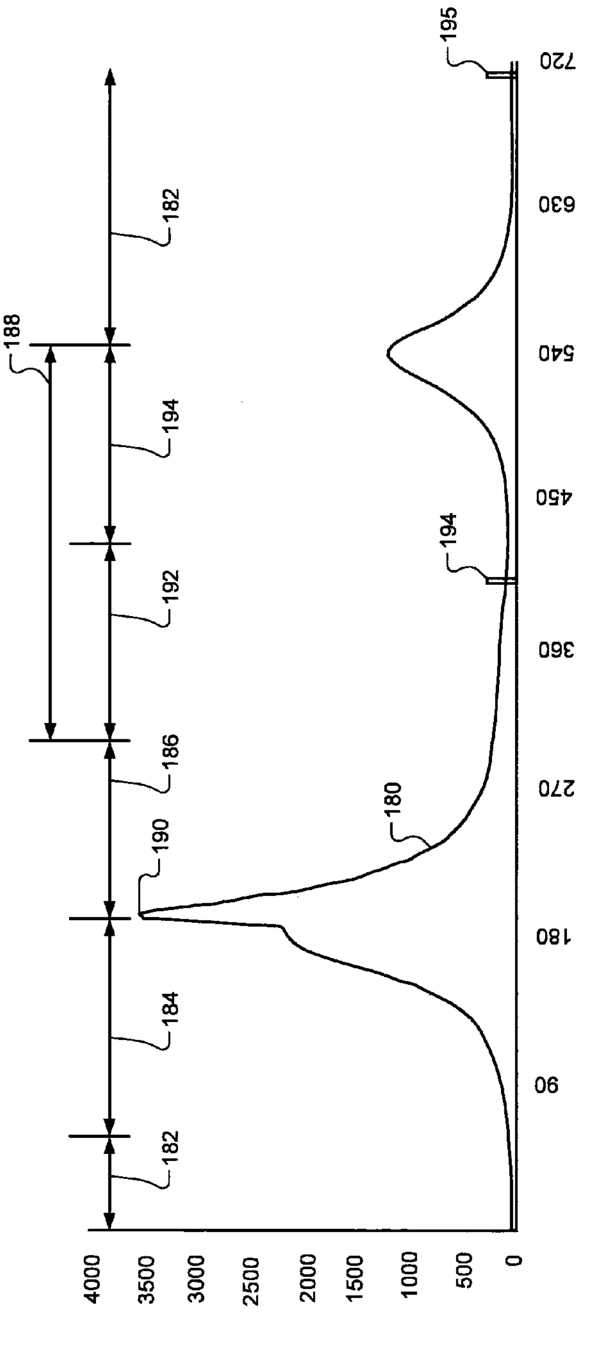
FIG. 4 is a graph of a cylinder pressure trace illustrating cylinder pressure sensor reset timing in accordance with the present disclosure.

In FIG. 4, a graph of a cylinder pressure trace 180 illustrating cylinder pressure sensor reset timing is shown. The cylinder pressure trace 180 is an example cylinder pressure trace for a HCCI engine. Example pressure changes (vertical axis) relative to crank angle position (horizontal axis) are shown for an intake stroke 182, a compression stroke 184, an ignition stroke 186, and an exhaust stroke 188 of an engine. During the intake stroke 182, one or more intake valves are open, which decreases pressure within a cylinder. During the compression stroke, the intake valve(s) and exhaust valve(s) are closed. An air/fuel mixture in the cylinder is compressed, which increases pressure in the cylinder. A peak pressure is designated 190. The air/fuel mixture may be ignited at or within a predetermined range of a top dead center piston location. The resulting pressure on the piston provides the energy to propel the engine rotation. The increase in cylinder volume and a relationship between the increased cylinder volume and a burned charge in the cylinder determines when the cylinder pressure peak occurs.

The exhaust stroke 188 follows the ignition stroke 186. The exhaust stroke 188 may include an exhaust phase 192 and a recompression phase 194. During the exhaust phase 192, the exhaust valve(s) are open to release a portion of the exhaust in the cylinder to an exhaust system. At a predetermined time and/or crank angle, the exhaust valve is closed. The recompression phase 194 starts subsequent to closing the exhaust valve(s) and includes compressing the exhaust remaining in the cylinder prior to a next intake stroke.

As shown by the graph, low pressure points exist during the intake stroke 182 and the exhaust phase 192 of the exhaust stroke 188. For this reason, cylinder pressure sensors (e.g., cylinder pressure sensors 16, 112, 114 in FIGS. 1-3) may be reset during the intake stroke and/or during the exhaust phase. Example reset points (or crank angles) are designated 194, 195. The first example point 194 is at approximately 405°±10°, which is prior to the closing of the exhaust valve. The second example point 195 is at approximately 710°±10°.

The cylinder pressure sensors may be reset during the intake stroke 182 and/or during the exhaust phase 192. The cylinder pressure sensors may be reset when pressures within the cylinder are at a minimum value. Although the cylinder pressures sensors may be reset during other strokes or phases, this may lead to improper setting of set points in the sensors and result in inaccurate cylinder pressure sensor output voltages and/or or current levels.

Figure 5:
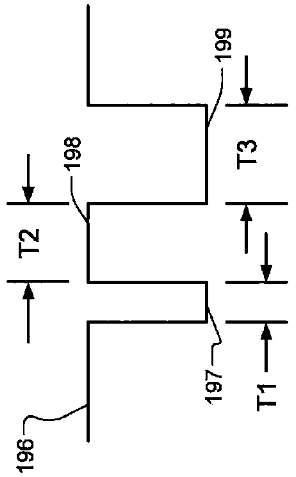
FIG. 5 is a signal diagram illustrating a reset signal in accordance with the present disclosure.

Referring to FIGS. 2, 3 and FIG. 5, in which a signal diagram illustrating a reset signal 196 is shown. The reset signals generated by the cylinder pressure modules 154, 156 and/or detected based on signals generated by the cylinder pressure modules 154, 156 may be encoded. Encoding the reset signals and configuring the cylinder pressure sensors 112, 114 to detect and decode the encoded reset signals prevents the cylinder pressure sensors 112, 114 from being reset due to noise (e.g., electromagnetic interference (EMI)). The reset signal 196 provides an example of an encoded reset signal.

The reset signals may include a reference pulse (first pulse) 197 followed by one or more encoded reset pulses 198, 199. The reference pulse 197 may provide a reference period T1. The encoded reset pulses 198, 199 may have a period that is a multiple of the reference period T1. For example, the reset pulse (or second pulse) 198 may have a period of 2*T1 or T2. The reset pulse (or third pulse) 199 may have a period of 3*T1 or T3. The periods T1, T2, T3 may refer to periods between transitions states or transitions of the reset signal between LOW and HIGH states. A transition state may refer to when the reset signal is transitioning from a LOW state to a HIGH state or from a HIGH state to a LOW state. For example, the period T1 is an amount of time between a first transition state and a next (or second) transition state. The first transition state includes a transition from a HIGH state to a LOW state. The second transition state includes a transition from a LOW state to a HIGH state.

The timer control modules 150, 152 and/or the cylinder pressure modules 154, 156 may control period lengths of the reset signals RESET1, RESET2. For example, the modules 150-156 may set and adjust lengths of the periods of pulses (e.g., T1, T2, T3) when generating and/or encoding the reset signals RESET1, RESET2. The reset signals RESET1, RESET2 may be in the form of a gray code, a binary signal, and/or a digital signal. The reset signals RESET1, RESET2 may alternate between minimum and maximum levels for predetermined periods.

The minimum and maximum levels may refer to minimum and maximum (i.e. swing) operating output voltages (e.g., 0.5-4.5 volts (V)) and/or manufacturing swing voltages (e.g. 0-5V) of the cylinder pressure sensors 112, 114. A cylinder pressure sensor may be setup such that minimum and maximum expected operating pressures experienced by the cylinder pressure sensor correspond to the swing operating output voltages as opposed to the manufacturing swing voltages.

Figure 6:
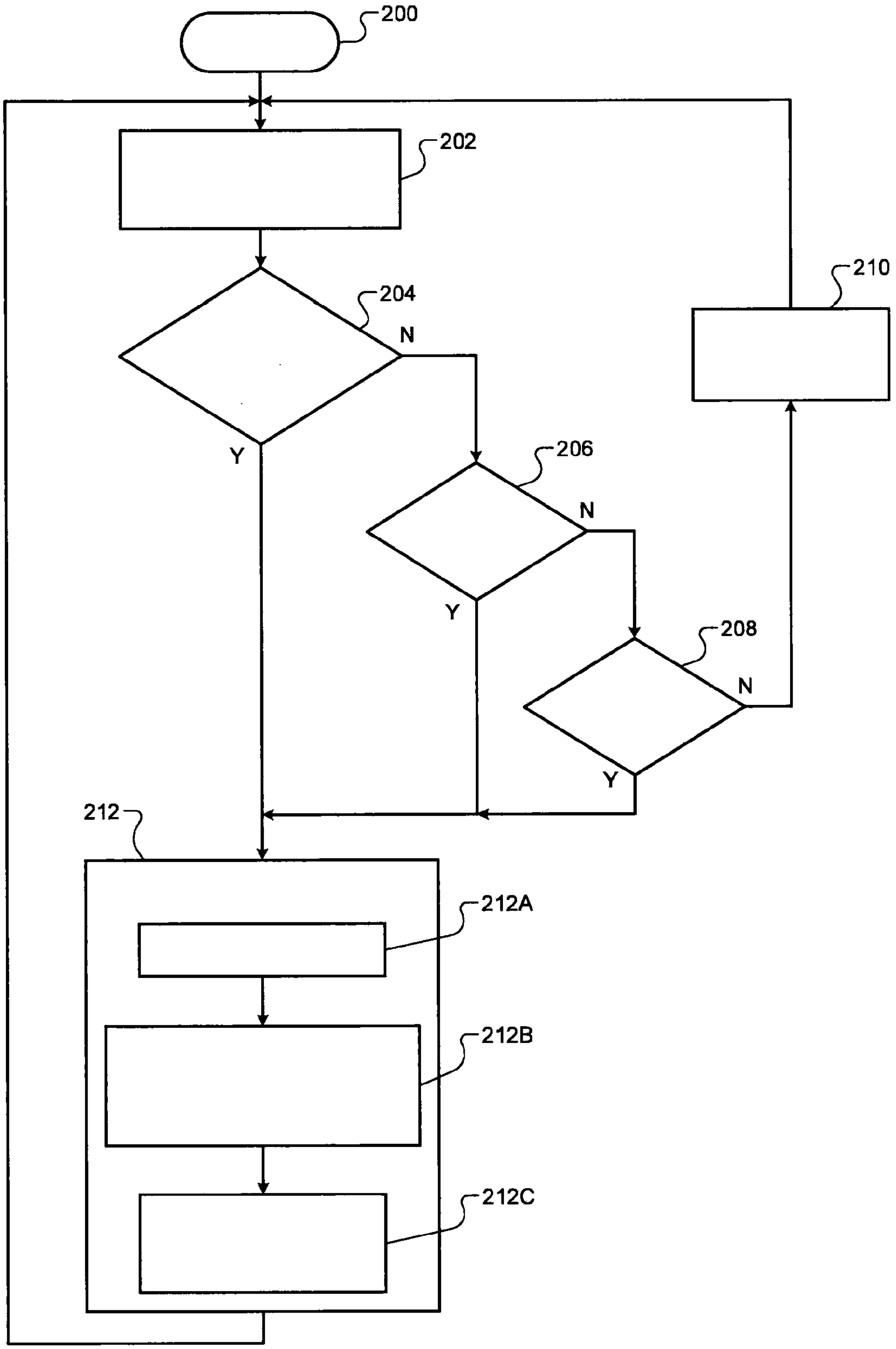
FIG. 6 illustrates a method of resetting a cylinder pressure sensor in accordance with the present disclosure.

The engine system 10 of FIG. 1 (or reset systems 18, 100, 102 of FIGS. 1-3) may be operated using numerous methods, an example method is provided by the method of FIG. 6. In FIG. 6 illustrates a method of resetting a cylinder pressure sensor is shown. Although the following tasks are primarily described with respect to the implementations of FIGS. 1-5, the tasks may be easily modified to apply to other implementations of the present disclosure. The tasks may be iteratively performed. Also, although the following tasks are described for a single cylinder and a single cylinder pressure sensor, the tasks may be modified for multiple cylinders and/or multiple cylinder pressure sensors. The method may begin at 200.

At 202, an ECM and/or a module of the ECM (e.g., one of the timer control modules 150, 152 or cylinder pressure modules 154, 156) determine one or more parameters of a cylinder and/or a cylinder pressure sensor (e.g., the cylinder pressure sensors 16, 112, 114). The parameters may include a pressure in the cylinder, a voltage and/or current output of the cylinder pressure sensor, and/or a pressure determined based on a current and/or voltage output of the cylinder pressure sensor. The determined pressure may be an estimated actual pressure in the cylinder, a pressure indicated according to voltage and/or current output of the sensor, and/or an offset pressure. The offset pressure may be equal to a difference between the actual pressure and the pressure indicated according to voltage and/or current output of the sensor.

One or more of the following tasks 204-208 may be performed. Tasks 204-208 are provided as examples of triggers for initiating a reset of the cylinder pressure sensor. These triggers are provided as examples and may not be performed. One or more other triggers may be incorporated.

At 204, the ECM and/or the module of the ECM determines whether one or more of the parameters determined at 202 exceed respective predetermined thresholds and/or are outside of respective ranges. If one of the parameters has exceeded a predetermined threshold and/or is outside of a predetermined range, task 212 may be performed, otherwise task 206 may be performed.

At 206, the ECM and/or the module of the ECM may determine if a current engine cycle has ended and/or a next engine cycle has started. An engine cycle in a four stroke engine, may refer to one cycle through intake, compression, ignition, and exhaust strokes. The cylinder pressure sensor may be reset during each engine cycle as a default or may be reset during every predetermined number of engine cycles and/or during selected engine cycles. Task 212 may be performed when a next engine cycle is to begin and/or has started, otherwise task 208 may be performed.

At 208, the ECM and/or the module of the ECM may determine whether a predetermined period has lapsed. A predetermined period may have lapsed when a timer (e.g., the timer 158) has decremented to 0 and/or has exceeded the predetermined period. The cylinder pressure sensor may be reset periodically and/or subsequent to the predetermined period lapsing. Task 212 may be performed when the predetermined period has lapsed, otherwise task 210 may be performed. At 210, a timer may be incremented.

At 212, the cylinder pressure sensor may be reset. At 212A, the reset signal (e.g., the reset signals RESET1, RESET2) is generated. At 212B, the output of the cylinder pressure sensor may be pulled down or up and/or a reset circuit may transition between normal and override states. The normal state may refer to when the output of the cylinder pressure sensor is not being pulled down and/or up via a reset circuit (e.g., one of the reset circuits 108, 110). In the normal state, the transistors 150, 160 may isolate the output 130, 133 of the cylinder pressure sensors 112, 114 from the voltage references 132, 134.

The override state may refer to when the output of the cylinder pressure sensor is being pulled down and/or up via the reset circuit. The ECM and/or the module of the ECM may verify that the output of the cylinder pressure sensor is being pulled down or up by monitoring the output signal or cylinder pressure signal from the cylinder pressure sensor. The ECM and/or the module of the ECM may transition the output of the cylinder pressure sensor between LOW and HIGH states and/or between the normal and override states to encode the reset signal detected by the sensor control module.

At 212C, the sensor control module (e.g., one of the sensor control modules 120, 122) receives and/or decodes the reset signal and resets the cylinder pressure sensor in response to the reset signal. The sensor control module may be programmed and/or include logic to determine whether state of the output of the cylinder pressure sensor is transitioning due to EMI or due to an encoded reset signal. As an example, the sensor control module may: determine periods of a received reference pulse (e.g., T1) and subsequent reset pulses (e.g., T2, T3); compare the periods of the reset pulses to the period of the reference pulse; and reset the cylinder pressure sensor when the periods of the reset pulses are integer multiples of the period of the reference pulse.

As another example, the sensor control module may: determine a first period of a received reference pulse (e.g., T1); estimate periods of pulses received subsequent to the reference pulse based on predetermined and saved values stored in a sensor memory (e.g., one of the sensor memories 124, 126); detect periods of the subsequently received pulses; and compare the estimated periods to the periods of the subsequently received pulses (e.g., T2, T3). If the estimated periods match the detected periods, the sensor control module resets the cylinder pressure sensor.

Resetting the cylinder pressure sensor may include resetting set points of output voltages of the cylinder pressure sensor. The set points of the output voltages may be adjusted relative to internal states, such as voltages, resistances, current levels and/or pressures of sensor elements (e.g., the sensor elements 116, 118). The output voltages may drift relative to the internal states of the cylinder pressure sensor over time. The output voltages of the cylinder pressure sensor may drift relative to an applied pressure on the cylinder pressure sensor, which may be indirectly detected by the ECM and/or the ECM module. This drifting may be detected when one or more of the above-stated parameters exceeds a threshold or is outside one of the predetermined ranges, as above described for task 204.

As an example, the cylinder pressure sensor may be setup such that swing operating output voltages (e.g., 0.5-4.5V) of the sensor correspond to minimum and maximum pressures (e.g., 0-140 bar) expected to be detected by the sensor. When reset, the sensor control module may reset the minimum swing operating voltage (0.5V) to correspond to a current internal state (voltage, resistance, current level and/or pressure) of the cylinder pressure sensor. This may shift other operating output voltages of the cylinder pressure sensor up or down relative to respective sensor states.

In the ECM, when the output voltage of the cylinder pressure sensor is at the minimum swing operating voltage, the pressure may be determined as being equal to the minimum pressure (e.g., 0 bar). Thus, the above-described drift compensation allows the ECM to continue to accurately estimate cylinder pressures.

The method may end upon completion of task 212 and/or return to task 202. The timer may be reset upon completion of task 212. The above-described tasks are meant to be illustrative examples; the tasks may be performed sequentially, synchronously, simultaneously, continuously, during overlapping time periods or in a different order depending upon the application.

The above-described method compensates for drift in output voltage and/or current of a cylinder pressure sensor. The method provides resetting a cylinder pressure sensor and prevents false triggering a reset of the cylinder pressure sensor due to EMI or other noise.

The resetting of the cylinder pressure sensor as described in the above method may include a step change in the output of the sensor when the output of the sensor has drifted out of a predetermined range. The drifting of the sensor output may be detected by the ECM and/or the ECM module as described above or may be detected by the sensor control module.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A sensor reset system comprising:
- an engine control module configured to
  - receive a sensor pressure signal from a cylinder pressure sensor, wherein the sensor pressure signal indicates a pressure within a cylinder of an engine,
  - control operation of the engine based on the sensor pressure signal,
  - determine whether to reset the cylinder pressure sensor and generate a reset signal, and
  - encode the reset signal to generate an encoded reset signal; and
- a sensor reset circuit configured to adjust an output of the cylinder pressure sensor based on the encoded reset signal to reset the cylinder pressure sensor.

2. The sensor reset system of claim 1, wherein the engine control module is configured to:
- determine a parameter of at least one of the cylinder pressure sensor and the cylinder based on the sensor pressure signal;
- determine whether the parameter has exceeded a predetermined threshold; and
- generate the reset signal when the parameter has exceeded the threshold.

3. The sensor reset system of claim 2, wherein the parameter is a voltage output of the cylinder pressure sensor.

4. The sensor reset system of claim 2, wherein the parameter is an estimated pressure within the cylinder.

5. The sensor reset system of claim 1, wherein the engine control module is configured to:
- determine an offset pressure of each cylinder of the engine including based on the sensor pressure signal and other pressure sensor signals;
- determine whether the offset pressures have exceeded a predetermined threshold; and
- generate the reset signal when one of the offset pressures has exceeded the threshold.

6. The sensor reset system of claim 1, further comprising the cylinder pressure sensor, wherein the cylinder pressure sensor comprises a sensor control module.

7. The sensor reset system of claim 6, wherein the sensor control module resets the cylinder pressure sensor based on the encoded reset signal, wherein the sensor control module in resetting the cylinder pressure sensor adjusts set points of output voltages of the cylinder pressure sensor relative to internal states of the cylinder pressure sensor.

8. The sensor reset system of claim 7, wherein the internal states comprise at least one of an internal voltage and an internal resistance of a sensor element of the cylinder pressure sensor.

9. The sensor reset system of claim 1, wherein the sensor reset circuit comprises a transistor with a first terminal, a second terminal, and a control terminal, and wherein:
- the first terminal is connected to the output of the cylinder pressure sensor and to an input of the engine control module;
- the second terminal is connected to a voltage reference; and
- the control terminal is connected to an output of the engine control module.

10. The sensor reset system of claim 9, wherein:
- the control terminal receives the encoded reset signal;
- the transistor isolates the output of the cylinder pressure sensor from the voltage reference when in a first state; and
- the transistor pulls down a voltage of the output of the cylinder pressure sensor to the voltage reference when in a second state.

11. The sensor reset system of claim 1, wherein the sensor reset circuit comprises a transistor with a first terminal, a second terminal, and a control terminal, and wherein:
- the first terminal is connected to a voltage reference;
- the second terminal is connected to the output of the cylinder pressure sensor and to an input of the engine control module; and
- the control terminal is connected to an output of the engine control module.

12. The sensor reset system of claim 11, wherein:
- the control terminal receives the encoded reset signal;
- the transistor isolates the output of the cylinder pressure sensor from the voltage reference when in a first state; and
- the transistor pulls up a voltage of the output of the cylinder pressure sensor to the voltage reference when in a second state.

13. The sensor reset system of claim 1, wherein the encoded reset signal comprises:
- a reference pulse with a first period; and
- a reset pulse with a second period, wherein the second period is an integer multiple of the first period.

14. The sensor reset system of claim 13, further comprising the cylinder pressure sensor with a sensor control module, wherein the sensor control module:
- detects the reference pulse and the reset pulse;
- detects the first period of the reference pulse and the second period of the reset pulse;
- compares the first period to the second period; and
- resets the cylinder pressure sensor based on the comparison between the first period and the second period.

15. The sensor reset system of claim 13, further comprising the cylinder pressure sensor with a sensor control module, wherein the sensor control module:
- detects the reference pulse and the reset pulse;
- detects the first period of the reference pulse and the second period of the reset pulse;
- determines an estimate period of the reset pulse based on the first period;
- compares the second period to the estimate period; and
- resets the cylinder pressure sensor based on the comparison between the second period to the estimate period.

16. A method of resetting a cylinder pressure sensor, the method comprising:
- receiving a sensor pressure signal from the cylinder pressure sensor,
- determining a parameter of at least one of the cylinder pressure sensor and a cylinder of an engine based on the sensor pressure signal,
- determining whether the parameter has exceeded a predetermined threshold,
- generating a reset signal via an engine control module when the parameter has exceeded the threshold, and
- encoding the reset signal to generate an encoded reset signal; and
- adjusting an output of the cylinder pressure sensor based on the encoded reset signal to reset the cylinder pressure sensor.

17. The method of claim 16, further comprising resetting the cylinder pressure sensor based on the encoded reset signal including adjusting set points of output voltages of the cylinder pressure sensor relative to internal states of the cylinder pressure sensor via a sensor control module,
- wherein the cylinder pressure sensor comprises the sensor control module, and
- wherein the internal states comprise at least one of an internal voltage and an internal resistance of a sensor element of the cylinder pressure sensor.

18. The method of claim 16, further comprising:
- receiving the encoded reset signal via a control terminal of a transistor;
- isolating the output of the cylinder pressure sensor from a voltage reference when the transistor is in a first state; and
- pulling down a voltage of the output of the cylinder pressure sensor to the voltage reference when the transistor is in a second state.

19. The method of claim 16, further comprising:
- receiving the encoded reset signal via a transistor;
- isolating the output of the cylinder pressure sensor from a voltage reference when the transistor is in a first state; and
- pulling up a voltage of the output of the cylinder pressure sensor to the voltage reference when the transistor is in a second state.

20. The method of claim 16, wherein:
- the encoded reset signal comprises
  - a reference pulse with a first period, and
  - a reset pulse with a second period, wherein the second period is an integer multiple of the first period; and
- the method further comprises
  - detecting the reference pulse and the reset pulse via a sensor control module, wherein cylinder pressure sensor comprises the sensor control module,
  - detecting the first period of the reference pulse and the second period of the reset pulse,
  - comparing the first period to the second period, and
  - resetting the cylinder pressure sensor based on the comparison between the first period and the second period.

* * * * *